United States Patent
Creasey et al.

(10) Patent No.: US 6,992,774 B2
(45) Date of Patent: Jan. 31, 2006

(54) WAVELENGTH DETERMINING APPARATUS AND METHOD

(75) Inventors: Christopher David Creasey, Bury St. Edmunds (GB); Simon Meadowcroft, Stowmarket (GB)

(73) Assignee: Agilent Technologies, Inc., Palo Alto, CA (US)

( * ) Notice: Subject to any disclaimer, the term of this patent is extended or adjusted under 35 U.S.C. 154(b) by 356 days.

(21) Appl. No.: 10/613,780

(22) Filed: Jul. 3, 2003

(65) Prior Publication Data

US 2004/0051876 A1    Mar. 18, 2004

(30) Foreign Application Priority Data

Jul. 11, 2002 (EP) .................................. 02254893

(51) Int. Cl.
*G01B 9/02* (2006.01)
(52) U.S. Cl. ..................................... 356/450
(58) Field of Classification Search ................ 356/450, 356/454, 519
See application file for complete search history.

(56) References Cited

U.S. PATENT DOCUMENTS

| | | | |
|---|---|---|---|
| 4,309,671 A | 1/1982 | Malyon | 331/94.5 |
| 5,825,792 A | 10/1998 | Villeneuve et al. | 372/32 |
| 6,144,025 A | 11/2000 | Tei et al. | 250/226 |
| 6,259,712 B1 * | 7/2001 | DeCain et al. | 372/32 |
| 6,369,951 B1 | 4/2002 | Spanner | 359/629 |
| 6,714,309 B2 * | 3/2004 | May | 356/519 |
| 6,885,462 B2 * | 4/2005 | Lee et al. | 356/519 |

FOREIGN PATENT DOCUMENTS

DE    4114407 A1    11/1992
EP    1099943 A1    5/2001

OTHER PUBLICATIONS

Patent Abstracts of Japan, Publication No. 05340839.

* cited by examiner

*Primary Examiner*—Hwa(Andrew) Lee
*Assistant Examiner*—Michael A. Lyons (57) ABSTRACT

An apparatus for determining the wavelength of light emitted by, for example, a laser, includes three photodiodes. One photodiode receives a proportion of the light redirected from the main optical path by a beam splitter. A second photodiode receives a proportion of the light redirected from the main optical path by the beam splitter and passing through a broadband filter. A third photodiode receives light that has been caused to interfere by an interferometric device. The ratio of the light intensities at the first and second photodiodes provide a coarse determination of wavelength, when compared to a lookup table, and the ratio of the light intensities at the first and third photodiodes provide a more exact determination of the wavelength.

27 Claims, 7 Drawing Sheets

WAVELENGTH DETERMINING APPARATUS AND METHOD

BACKGROUND OF THE INVENTION

1. Field of the Invention

The present invention relates to an apparatus and method for determining a wavelength of electromagnetic radiation of the type emitted from a laser device, especially, though not exclusively, to such an apparatus and method for use in a wavelength locker, for example of the type that generates an error signal for controlling a wavelength of the light emitted by the laser device.

2. Brief Description of Related Developments

In a fibre-optic network, the wavelength of light used to communicate a signal is an important parameter. In particular, where Wavelength Division Multiplexing (WDM) systems are employed, different signals are communicated using respectively different wavelengths. Consequently, it is important to maintain the different wavelengths accurately in relation to components of the WDM system, for example multiplexers and demultiplexers, which add or remove wavelengths from the WDM system.

Typically, a semiconductor laser device is employed in a transmitter unit of the fibre-optic network. The wavelength of light transmitted by the laser device can be accurately controlled by altering a parameter, for example temperature, of the laser device using a closed loop feedback circuit. In this example, in order to determine whether to heat or cool the laser device, and to what extent, to lock the wavelength of the laser device to a predetermined wavelength, an error signal needs to be generated in the feedback circuit.

Known apparatus for detecting changes in the wavelength of the laser device are disclosed in U.S. Pat. No. 4,309,671, U.S. Pat. No. 6,144,025, U.S. Pat. No. 5,825,792. U.S. Pat. No. 4,309,671 discloses a laser diode, a proximal beam splitting mirror and a proximal photodiode to receive light from the proximal beam splitting mirror, a distal beam splitting mirror and a distal photodiode to receive light from the distal beam splitting mirror, and a filter is disposed between the distal beam splitting mirror and the distal photodiode. An electronic control circuit is also disclosed for stabilising the laser diode. When in use, a divergent beam is emitted by the laser diode. The proximal beam splitting mirror directs a proportion of the light incident upon the proximal beam splitting mirror onto the proximal photodiode. Similarly, light passing through the proximal beam splitting mirror is incident upon the distal beam splitting mirror, the distal beam splitting mirror directing a proportion of the light incident upon the distal beam splitting mirror onto the distal photodiode. The filter has a positive transmission gradient versus wavelength characteristic, so that the light passing through it is selectively attenuated depending on its wavelength. The two photodiodes are coupled to an amplifier whereby their ratio can be utilised as a measurement of the wavelength of the light emitted by the laser, and variations in that ratio (indicative of a variation in wavelength of emitted light) are used in feedback loop to control the laser diode. Usually, since such variations in the wavelength of light emitted by the laser diode are due to variations in temperature, the feedback loop is used to adjust the temperature of the laser diode.

U.S. Pat. No. 5,825,792 discloses an apparatus comprising a lens, a Fabry-Perot etalon and two photodiodes, the apparatus being copackaged with a semiconductor laser in an industry standard package known as a "butterfly" package. The etalon splits light emitted by the semiconductor laser and propagates the light over multiple paths of different lengths before recombination. Respective phases are accumulated over the multiple paths, the phases accumulated being wavelength-dependent. Consequently, the result of the recombination also depends upon wavelength. Again, the two photodiodes are coupled to an amplifier whereby their ratio can be utilised as a measurement of the wavelength of the light emitted by the laser, and variations in that ratio (indicative of a variation in wavelength of emitted light) are used in feedback loop to control the laser diode. By using an etalon, in which light transmission is caused by interference between light paths, the transmission characteristic is cyclical. Although, therefore, the same ratio between the outputs of the photodiodes will occur at different wavelengths whose transmission levels are the same, once the correct wavelength has been found, this apparatus will maintain the laser at that wavelength in the manner described above.

The dimensions of the etalon depend upon a required resolving power, R, of the etalon; the resolving power is a measure of a minimum change of wavelength that can be detected. The resolving power, R, of the etalon is given by the following equation:

$$R = F \frac{2nd}{\lambda_o}$$

where:
F is the coefficient of finesse,
n is the refractive index of the etalon,
d is the thickness of the etalon, and
$\lambda_o$ is the wavelength of operation.

As a practical example, in order to monitor a 100 GHz or 50 GHz channel spacing, at least one dimension of the etalon has to be approximately 1 mm or approximately 2 mm, respectively.

U.S. Pat. No. 6,144,025 discloses a laser diode coupled to a first optical fibre. When in use, light emitted by the laser diode propagates through the first optical fibre, a lens, a cut filter, after which the light is incident upon a beam splitter. A first photodiode is located on a first side of the beam splitter and a second photodiode is located on a second side of the beam splitter. An optical band-pass filter is disposed in-line between the beam splitter and the first photodiode. A proportion of the light incident upon the beam splitter is directed towards the first photodiode. A first proportion of the light directed towards the first photodiode is permitted to pass through to the first photodiode and a second proportion of the light directed towards the first photodiode is reflected by the optical band-pass filter to the second photodiode via the beam splitter. A certain proportion of the light incident upon the beam splitter via the cut filter is permitted to pass directly through the beam splitter to a lens that focuses the transmitted light into a second optical fibre.

In the apparatus of U.S. Pat. No. 6,144,025 the two photodiodes are coupled to an output ratio calculator, whose output is coupled to a wavelength controller in a feedback path to control the laser diode, in a similar manner to that described above. As an alternative to the optical band-pass filter, there can be used an interference filter to change the wavelength of light transmitted by the filter to the first photodiode.

As optical communication systems become more complicated, and it becomes desirable to utilise more separate wavelength channels, lasers that are not single wavelength are becoming more prevalent, since it is easier to tune them to operate at another wavelength than to replace them by another laser operating at the different wavelength. These tunable lasers often have a tunable range of approximately 30–40 nm. Furthermore, although the ITU presently requires a spacing of at least 0.8 nm between adjacent signalling channels, as demand for channels grows, it will be necessary to reduce the spacing further, so that the resolution of the wavelength detector and the laser locker will need to be higher than hitherto.

SUMMARY OF THE INVENTION

Accordingly, in a first aspect, the present invention, provides an apparatus for detecting a wavelength of electromagnetic radiation, the apparatus comprising a first electromagnetic radiation detector for receiving a first proportion of electromagnetic radiation that has been redirected from a main electromagnetic radiation path, a second electromagnetic radiation detector for receiving a second proportion of electromagnetic radiation that has been redirected from the main electromagnetic radiation path, a third electromagnetic radiation detector for receiving a third proportion of electromagnetic radiation that has been redirected from the main electromagnetic radiation path, a filter arranged for filtering the second proportion of the electromagnetic radiation before it reaches the second electromagnetic radiation detector, an interferometric device arranged for causing the third proportion of the electromagnetic radiation to interfere with itself before it reaches the third electromagnetic radiation detector, and processing means coupled to receive a first signal from the first electromagnetic radiation detector indicating an intensity of the first proportion of the electromagnetic radiation detected by the first electromagnetic radiation detector, a second signal from the second electromagnetic radiation detector indicating an intensity of the second proportion of the electromagnetic radiation from the filter detected by the second electromagnetic radiation detector and a third signal from the third electromagnetic radiation detector indicating an intensity of the third proportion of the electromagnetic radiation from the interferometric device detected by the third electromagnetic radiation detector, the processing means determining a wavelength of the electromagnetic radiation based on the ratios of the first and second signals and the first and third signals.

The filter may be a broadband filter.

In one embodiment, the apparatus further comprises at least one electromagnetic radiation splitter arranged in a main electromagnetic radiation path for redirecting at least one of the first, second and third proportions of electromagnetic radiation from the main path.

The electromagnetic radiation splitter can be arranged in the main path of the electromagnetic radiation for redirecting said first proportion of the electromagnetic radiation to the first electromagnetic radiation detector and for redirecting said second proportion of the electromagnetic radiation to the filter.

In one embodiment, the interferometric device may comprise a block of material that can transmit electromagnetic radiation, the block having a partially transmissive input face, an at least partially internally reflective output face and a pair of internally reflective side faces, such that said third proportion of electromagnetic radiation can, in use, partially externally reflect from and partially transmit through the input face, at least partially internally reflect from said output face, internally reflect from said side faces, and transmit back through the input face so as to interfere with the part that externally reflects from the input face.

The interferometric device may comprise the electromagnetic radiation splitter, wherein the interferometric device is arranged in the main electromagnetic radiation path for redirecting said first proportion of the electromagnetic radiation to the first electromagnetic radiation detector, for redirecting said second proportion of the electromagnetic radiation to the filter and for redirecting said third proportion of the electromagnetic radiation such that it interferes with itself and is directed to the third electromagnetic radiation detector.

The interferometric device can be formed of at least two conjoined sub-blocks of electromagnetic radiation transmitting material, so that the input and output faces of the interferometric device are formed from faces of the different sub-blocks, each sub-block having coatings of different reflective and transmissive characteristics formed thereon, whereby at least the input and output faces of the interferometric device have different reflective and transmissive characteristics on different areas thereof.

At least one of the coatings provided on at least part of the output face of the interferometric device can have a wavelength dependent transmission characteristic to form said filter.

The dimensions of the block are conveniently predetermined so that a portion of electromagnetic radiation incident on the input face of the block at an input area is internally reflected by the output face a predetermined number of times, so as to exit the block at the input area and interfere with the electromagnetic radiation incident on the input face of the block and externally reflected thereby, the predetermined number of times being determined according to the required spacing of interference peaks required at the third electromagnetic detector.

The predetermined number of times the electromagnetic radiation is internally reflected by the output face may be at least two times, possibly, at least three times.

In a further embodiment, the processing means compares the ratio of the first signal and the second signal with predetermined values to determine an approximate wavelength of the electromagnetic radiation, and compares the ratio of the first signal and the third signal with predetermined values to determine a more exact value for the wavelength of the electromagnetic radiation.

According to a second aspect, the invention provides a laser wavelength locking apparatus comprising a laser for emitting electromagnetic radiation along a main electromagnetic radiation path, an apparatus for detecting a wavelength of electromagnetic radiation emitted along said main electromagnetic radiation path as described above, a laser temperature controller coupled to the processing device for adjusting the temperature of the laser depending on the detected wavelength of the electromagnetic radiation emitted by the laser.

The laser can be a tunable laser.

In a third aspect, the invention provides a method of detecting a wavelength of electromagnetic radiation, the method comprising the steps of receiving a first proportion of electromagnetic radiation that has been redirected from a main electromagnetic radiation path, receiving a second proportion of electromagnetic radiation that has been redirected from the main electromagnetic radiation path via a filter, receiving a third proportion of electromagnetic radiation that has been redirected from the main electromagnetic radiation path via an interferometric device so as to interfere with itself, processing a first signal indicating an intensity of the first proportion of the electromagnetic radiation and a second signal indicating an intensity of the filtered second proportion of the electromagnetic radiation to provide a ratio of the first and second signals, processing the first signal and a third signal indicating an intensity of the interfered third proportion of the electromagnetic radiation to provide a ratio of the first and third signals, and utilising the ratios of the first and second signals and the first and third signals to determine a wavelength of the electromagnetic radiation.

In one embodiment, the method further comprises the step of redirecting said first proportion of the electromagnetic radiation to a first electromagnetic radiation detector and of redirecting said second proportion of the electromagnetic radiation to the filter.

The interferometric device may comprise a block of material that can transmit electromagnetic radiation, the block having a partially transmissive input face, an at least partially internally reflective output face and a pair of internally reflective side faces, the method comprising the step of redirecting said third proportion of electromagnetic radiation onto the input face of the block so that it is partially externally reflected from and partially transmitted through the input face, at least partially internally reflected from said output face, internally reflected from said side faces, and transmitted back through the input face so as to interfere with the part that is externally reflected from the input face.

In one preferred embodiment, the interferometric device is arranged in the main electromagnetic radiation path for redirecting said first proportion of the electromagnetic radiation to a first electromagnetic radiation detector, for redirecting said second proportion of the electromagnetic radiation to the filter and for redirecting said third proportion of the electromagnetic radiation such that it interferes with itself and is directed to a third electromagnetic radiation detector.

The utilising step may comprise comparing the ratio of the first signal and the second signal with predetermined values to determine an approximate wavelength of the electromagnetic radiation, and comparing the ratio of the first signal and the third signal with predetermined values to determine a more exact value for the wavelength of the electromagnetic radiation.

According to a fourth aspect, the invention provides a method of locking the wavelength of electromagnetic radiation emitted by a tunable laser, the method comprising the steps of emitting electromagnetic radiation from a tunable laser along a main electromagnetic radiation path, detecting a wavelength of electromagnetic radiation emitted along said main electromagnetic radiation path utilising the method described above, and adjusting a temperature of the laser depending on the detected wavelength of the electromagnetic radiation emitted by the laser.

In a fifth aspect, the invention provides an interferometric device comprising a block of material that can transmit electromagnetic radiation, the block having a partially transmissive input face, an at least partially internally reflective output face and a pair of internally reflective side faces, such that electromagnetic radiation incident on the input face, in use, partially externally reflects from and partially transmits through the input face, at least partially internally reflects from said output face, internally reflects from said side faces, and transmits back through the input face so as to interfere with the part that externally reflects from the input face.

The interferometric device can be formed of at least two conjoined sub-blocks of electromagnetic radiation transmitting material, so that the input and output faces of the interferometric device are formed from faces of the different sub-blocks, each sub-block having coatings of different reflective and transmissive characteristics formed thereon, whereby at least the input and output faces of the interferometric device have different reflective and transmissive characteristics on different areas thereof.

In one embodiment, the dimensions of the block are predetermined so that a portion of electromagnetic radiation incident on the input face of the block at an input area is internally reflected by the output face a predetermined number of times, so as to exit the block at the input area and interfere with the electromagnetic radiation incident on the input face of the block and externally reflected thereby, the predetermined number of times being determined according to the required spacing of interference peaks of the electromagnetic radiation.

The predetermined number of times the electromagnetic radiation is internally reflected by the output face is at least two times, and more preferably, at least three times.

According to a sixth aspect, the invention provides a method of causing electromagnetic radiation to interfere, the method comprising the steps of providing an interferometric device as described above, directing the electromagnetic radiation onto the input face, so that it partially externally reflects from and partially transmits through the input face, at least partially internally reflects from said output face, internally reflects from said side faces, and transmits back through the input face so as to interfere with the part that externally reflects from the input face.

A seventh aspect of the invention provides a method of fabricating an interferometric device as described above, the method comprising the steps of conjoining at least two sub-blocks of electromagnetic radiation transmitting material, so that the input and output faces of the interferometric device are formed from faces of the different sub-blocks, each sub-block having coatings of different reflective and transmissive characteristics formed thereon, whereby at least the input and output faces of the interferometric device have different reflective and transmissive characteristics on different areas thereof.

The method may further comprise the step of predetermining the dimensions of the block so that a portion of electromagnetic radiation incident on the input face of the block at an input area is internally reflected by the output face a predetermined number of times, so as to exit the block at the input area and interfere with the electromagnetic radiation incident on the input face of the block and externally reflected thereby, the predetermined number of times being determined according to the required spacing of interference peaks of the electromagnetic radiation.

The step of conjoining the two sub-blocks of electromagnetic radiation transmitting material may comprise the steps of applying a curable cement between the faces of the sub-blocks to be conjoined, adjusting the relative positions of the sub-blocks so that the electromagnetic radiation that internally reflects within the block is substantially aligned with the electromagnetic radiation that reflects from the input face so as to interfere therewith, and curing the cement while the sub-blocks are fixed in the adjusted relative positions.

The step of adjusting may comprise passing the electromagnetic radiation into the block and measuring the interference pattern while adjusting the relative positions of the sub-blocks until the interference pattern is optimal.

The curable cement may be an ultra-violet light curable optical cement having a refractive index matching the sub-blocks.

It should be appreciated that references to "light" herein refer to electromagnetic radiation of wavelengths between about 300 nm and about 10 μm, preferably between about 400 nm and about 2 μm, very preferably between about 800 nm and 1700 nm.

BRIEF DESCRIPTION OF THE DRAWINGS

Several embodiments of the invention will now be described, by way of example only, with reference to the accompanying drawings in which.

Throughout the following description identical reference numerals will be used to identify like parts.

DETAILED DESCRIPTION OF THE PREFERRED EMBODIMENT(s)

Figure 1:
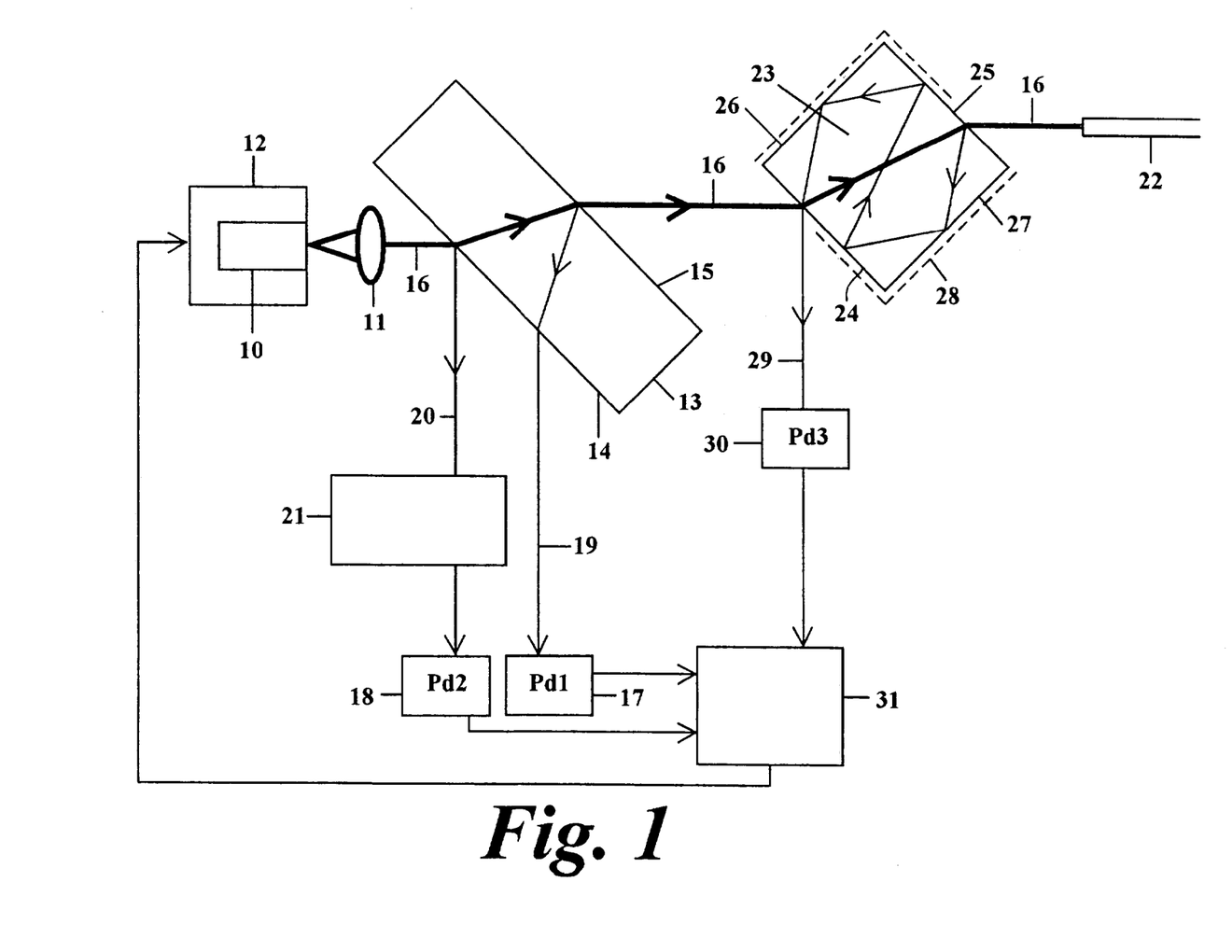
FIG. 1 is a schematic diagram of a wavelength locking apparatus according to one embodiment of the present invention.

Referring, first to FIG. 1, a first embodiment of a wavelength locking device is shown. In this embodiment, a tunable laser device 10, for example a semiconductor laser diode disposed in a laser package 12, is arranged to launch light emitted by the laser device 10 into an optical fibre 22. A collimating lens 11 is disposed adjacent the laser device 10. A reflective component 13, in this example a bulk component having a first partially reflective surface 14 substantially opposite a second partially reflective surface 15, acts as a beam splitter and is disposed in a main optical path 16 adjacent the collimating lens 11. The first partially reflective surface 14 externally reflects a small proportion of the light incident on it from the collimating lens 11 and transmits the remainder, which is refracted at the surface 14, through the component 13 to the second partially reflective surface 15. The second partially reflective surface 15 internally reflects a small proportion of the light incident on it from the first partially reflective surface 14 back to the first partially reflective surface 14 and transmits the remainder, which is refracted at the surface 15, along the main optical path 16 towards the optical fibre 22.

To one side of the beam splitter 13, first and second photodiodes 17 and 18 are disposed. The beam splitter 13 is placed and aligned so as to direct light, which was internally reflected from the second partially reflective surface 15 back to the first partially reflective surface 14 and partially transmitted (and refracted) through the first partially reflective surface 14, along a first optical path 19 towards the first photodiode 17. Similarly, the placing and alignment of the beam splitter 13 is such as to direct light reflected by the first partially reflective surface 14 along a second optical path 20 towards the second photodiode 18. An angle at which the beam splitter 13 is disposed relative to the main optical path 16 is one factor that can dictate the direction of the first and second optical paths 19, 20. Another factor is the relative position of the first partially reflective surface 14 and the second partially reflective surface 15 which can be varied so as to control respective reflection towards the first and second photodiodes 17, 18. A filter, for example a broadband filter, 21 is disposed in the second optical path 120 adjacent the second photodiode 18 so as to filter the light from the beam splitter 13 incident upon the second photodiode 18. The filter covers at least 30 nm, preferably at least 40 nm and most preferably 50–60 nm in waveband.

An interferometric device 23 is disposed in the main optical path 16 between the beam splitter 13 and the optical fibre 22. The interferometric device 23 is formed of a fused silica block having particular predetermined dimensions arranged to cause a proportion of light incident upon it to interfere so as to produce a wavelength dependent interference pattern of peaks and troughs. The device 23 has an input face 24 facing the main optical path 16 from the beam splitter 13 at an angle, and an output face 25 facing the main optical path 16 to the optical fibre 22. The input and output faces 24 and 25 are have a partially reflective coating provided over their areas where the main optical path 16 passed through them. Other parts of the input and output faces 24 and 25, as well as side faces 26 and 27, have a metallic reflective coating 28 disposed thereon to substantially internally totally reflect light incident on them, as will be further described below.

The interferometric device 23 is placed and aligned so as to direct a small proportion of light, reflected from the partially reflective coating on the input face 24, along a third optical path 29 towards a third photodiode 30. The remainder of the light incident on the input face 24 is transmitted through the input face (and refracted) towards the output face 25, where, most of the light is transmitted through the output face (and refracted) into the main optical path 16 outwards towards the optical fibre 22. However, a small proportion of the light incident on the output face 25 is internally reflected onto the side face 27, from where it is substantially totally reflected onto the part of the input face 24 that has the metallic reflective coating 28 disposed thereon, so that it is substantially totally internally reflected therefrom to the part of the output face 25 that has the metallic reflective coating 28 disposed thereon, so that it is substantially totally internally reflected therefrom to the side face 26, from which it is substantially totally reflected back to the input face 24 at the point where it first entered the device. At this point, most of the light is transmitted through the input face (and refracted) to interfere with the proportion of light that was initially reflected from the input face 24, and be directed into optical path 29 towards photodiode 30. Thus, the photodiode 30 receives an interference pattern caused by interference of the proportion of the light externally reflected from the input face 24 of the interferometric device 23 and the proportion of the light that passed into the interferometric device 23 and was then reflected internally to exit the interferometric device at the same point as it entered it.

In operation, therefore, light emitted by the laser diode 10 follows the main optical path 16 and is collimated by the collimating lens 11 before propagating towards the beam splitter 13. Upon incidence upon the beam splitter 13, a proportion of the light emitted by the laser diode 10 is transmitted through first partially reflective surface 14 to the second partially reflective surface 15 of the beam splitter 23. A first proportion of the light is reflected by the second partially reflective surface 15 and transmitted by the first partially reflective surface 14 towards the first photodiode 17 along the first optical path 19. A second proportion of the light emitted by the laser diode 10 is reflected by the first partially reflective surface 14 towards the second photodiode 18 along the second optical path 20. Remaining unreflected light propagates through the beam splitter 23 so as to continue substantially along the main optical path 16 towards the interferometric device 23.

Upon incidence upon the interferometric device 23, a main proportion of the light from the beam splitter 13 is transmitted through input face 24 to the output face 25. A third proportion of the light is externally reflected by the partially reflective coating on the input face 24 towards the third photodiode 30 along the third optical path 29. Of the light transmitted through the interferometric device 23 to the output face 25, a further proportion is internally reflected by the partially reflective coating on the output face 25 and is then substantially totally internally reflected around all the faces of the interferometric device 23 until it reaches the input face 23 at the point at which the light entered the interferometric device 23. A proportion of that internally reflected light is then transmitted through the input face 23 and interferes with the light externally reflected by the input face 23 to produce an interference pattern at the third photodiode 30. Remaining unreflected light propagates through the interferometric device 23 so as to continue substantially along the main optical path 16 towards the optical fibre 22.

Figure 2A:
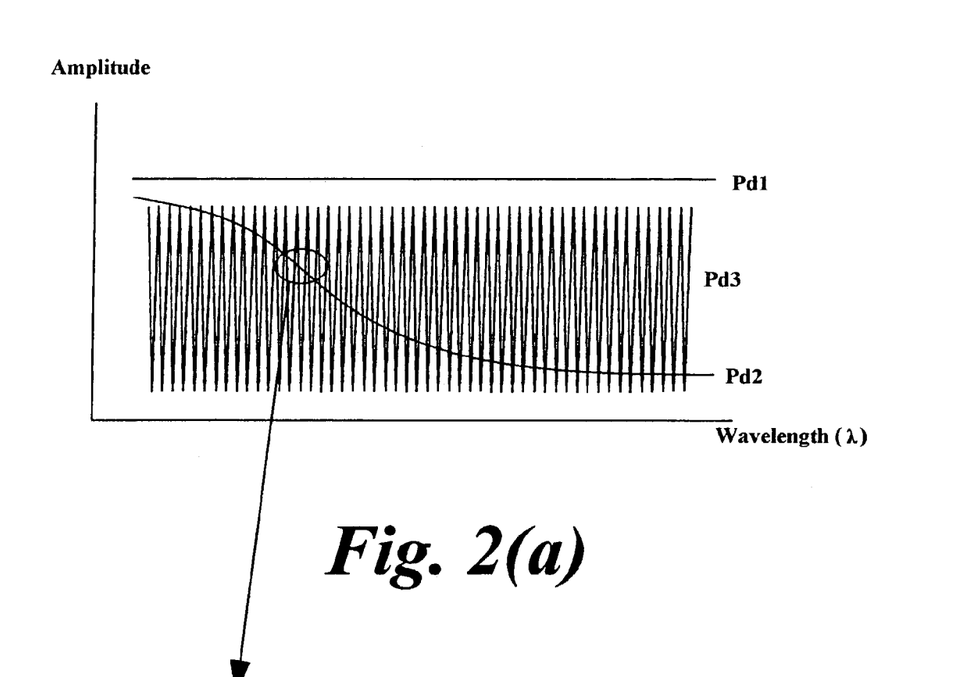
FIG. 2 is a schematic graph (including an enlarged portion in FIG. 2(b)) of light intensities in the apparatus of FIG. 1.
Figure 2B:
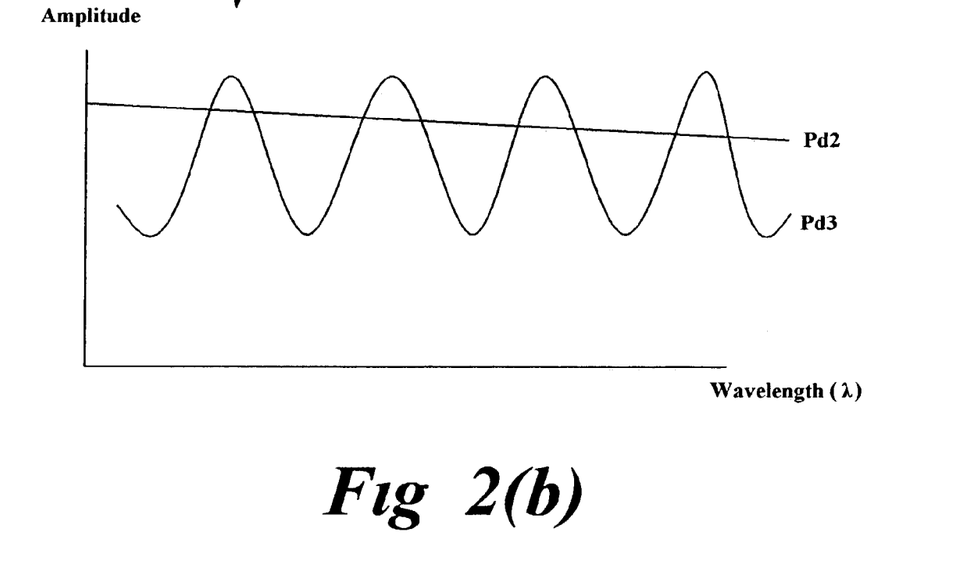

Turning now to FIGS. 2(a) and 2(b), there is shown a schematic representation of the amplitude (or intensity) of light incident on each of the three photodiodes 17, 18 and 30 as a function of wavelength. As can be seen in FIG. 2(a), the intensity of light incident on photodiode 17 (shown as graph Pd1) is substantially independent of wavelength and therefore provides a reference value for the intensity of light at a particular wavelength. The intensity of light incident on the second photodiode 18, is shown as graph Pd2, and can be seen to be dependent on wavelength according to the transmission characteristic of the broadband filter 21. Graph Pd3 shows the interference fringes formed by the interference of the light passing along the third optical path 29 to the third photodiode 30. FIG. 2(b) shows an enlarged portion of graphs Pd2 and Pd3 of FIG. 2(a).

From a consideration of the graphs shown in FIG. 2, it will thus be apparent that the ratio Pd1/Pd2 will not vary substantially over quite broad wavebands, so that the sole use of this ratio to determine the wavelength of the light will be prone to error and will not provide a very accurate mechanism for controlling the laser to maintain accurate wavelength output. On the other hand, the ratio Pd1/Pd3, although varying substantially over narrow wavebands, will repeat periodically, according to the period of the peaks and troughs forming the interference fringes. Therefore, the latter ratio can be used to accurately maintain the wavelength of a laser, once it has been previously set, but cannot be used to initially set the wavelength, since the ratio would be the same for a number of different wavelengths.

Accordingly, the outputs of photodiodes 17, 18 and 30 are passed to a processing device 31, such as a computer, to determine both ratios Pd1/Pd2 and Pd1/Pd3. Using the first ratio Pd1/Pd2, the wavelength can be approximately determined using a look-up table. The second ratio Pd1/Pd3 can then be used to accurately determine the wavelength, again from a look-up table. Thus, the wavelength of the tunable laser device 10 can be initially set by the computer 31 by reference to pre-determined tables stored in a memory. The second ratio can then be used to maintain the output of the laser at the desired wavelength if it begins to drift. The computer 31 therefore provides an output signal to a driver circuit (not shown) in the laser package 12, for example, a Proportional Integral Differential (PID) controller to influence the generation of light by the laser diode 10 so as to ensure that the wavelength of the light generated by the laser diode 10 remains substantially at a required wavelength. Examples of influencing the generation of light by the laser diode 10 include controlling the temperature of the laser diode 10, or where more than one current is applied to the laser diode 10, controlling one or more of those currents.

Figure 3:
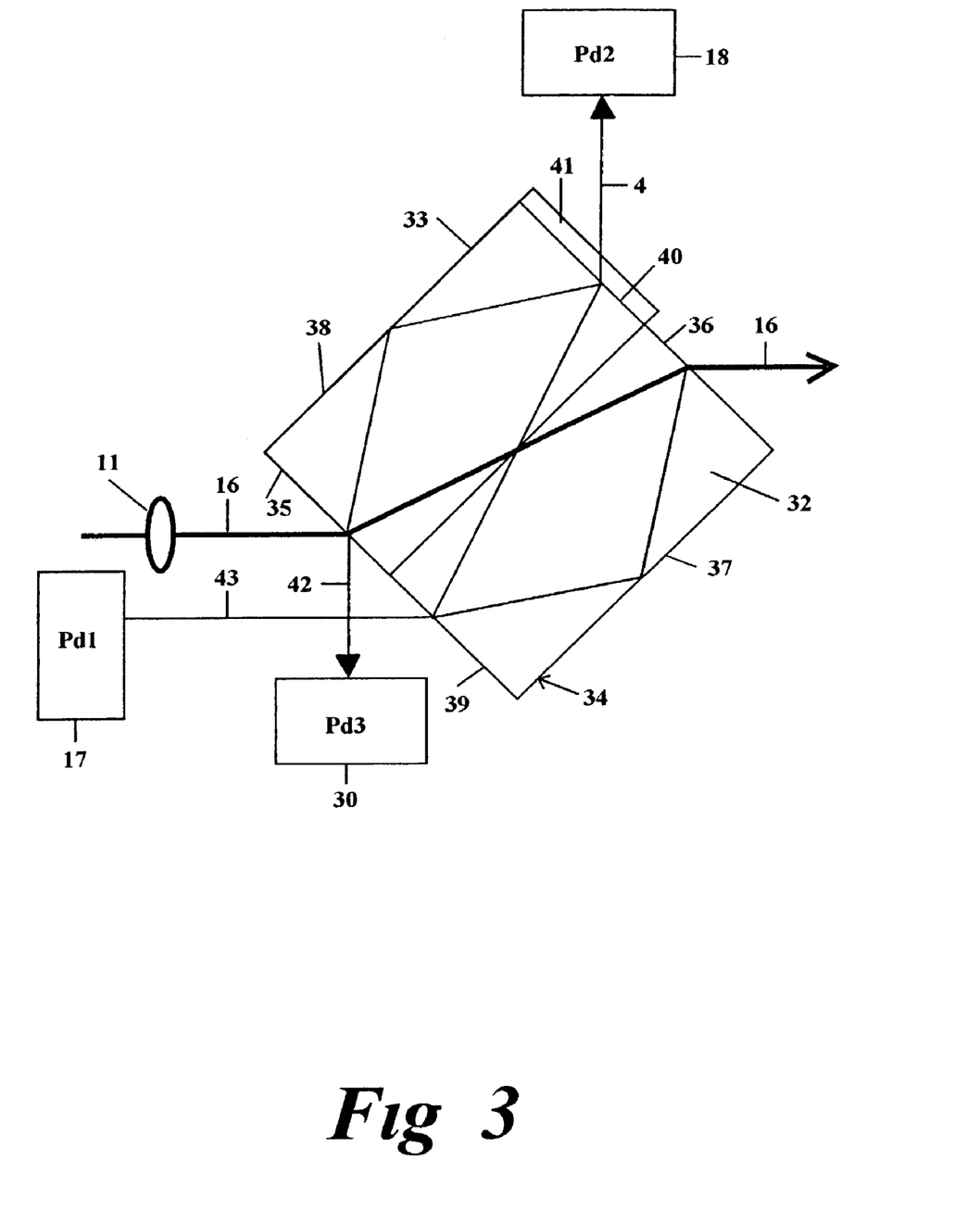
FIG. 3 is a schematic diagram of a part of wavelength locking apparatus according to a further embodiment of the present invention.

In another embodiment, and referring to FIG. 3, the apparatus of FIG. 1 is adapted by using the interferometric device to also provide the beam splitting and filtering functions. In this embodiment, light passes along the main optical path 16 from the laser device (not shown) through the collimating lens 11 directly to an interferometric device 32. The interferometric device 32 is formed of two blocks 33 and 34 of fused silica conjoined to form a single block so that light passing between them is substantially unaffected. Prior to being joined together, the blocks 33 and 34 are coated with partially reflective coatings having different transmission characteristics on different faces. Thus, the input face 35 of block 33 is provided with a coating that has 2% reflectiveness, whereas the output face 36 of block 34 has a coating with 8% reflectiveness. The side faces 37 and 38 have coatings of substantially 100% reflectiveness, as in the embodiment of FIG. 1, but face 39 of block 34 is provided with a coating having 50% reflectiveness, whereas face 40 of block 33 is provided with a dichroic mirror coating, which also acts as a filter 41.

Thus, in operation, 2% of the light from the main optical path 16 incident on input face 35 is reflected along third optical path 42 towards the third photodiode 30, and 98% of the light is transmitted (and refracted) towards the output face 36 of the device. 92% of the light incident on the output face 36 (that is 90% of the total light incident on the device) is transmitted along the main optical path 16 towards the optical fibre (not shown). However, 8% of the light incident on the output face 36 is internally reflected thereby and totally internally reflected off side face 37 to face 39. In this embodiment, instead of totally reflecting the light, the 50% reflectiveness coating, reflects 50% of it and transmits 50% of it along the first optical path 43 to the first photodiode 17. Thus, approximately 4% of the light originally incident on the device 32 is transmitted to the first photodiode 17. Of the remaining 50% reflected internally from face 39, a proportion is transmitted through face 40 and through dichroic filter coating 41 along the second optical path 44 to photodiode 18, and the rest is internally reflected off side face 38 to be transmitted through input face 35 to interfere with the portion of the light that was initially externally reflected from the input face 35, as described above in relation to FIG. 1. The outputs of the photodiodes are processed in the same manner as described earlier. As will be appreciated, this second embodiment is cheaper and easier to assemble, since it only has one component (the interferometric device) instead of three components (the beam splitter, the filter and the interferometric device).

Of course, if manufacturing tolerances are not very accurate, the faces of the two blocks 33 and 34 may not be precisely parallel or perpendicular to the input and output faces 35 and 36, so that, after the internal reflection, the beams may not overlap, or at least may not overlap sufficiently to produce the required interference patterns. In order to try to overcome the problem of any manufacturing imperfections, the two blocks 33 and 34 can be conjoined using an ultra-violet cured optical cement. Before the optical cement is cured using ultra-violet light, the relative positions, including angles, of the blocks are adjusted in an alignment jig until they are at their optimum position (and/or angle) and the cement is then cured. This step may be useful to compensate for manufacturing errors in the blocks to enable the interference pattern to be caused by two overlapping parallel beams and for the interference peaks to matched in phase and free spectral range to a predefined grid, such as the ITU grid. Enabling the two overlapping beams to be parallel gives the best possible modulation depth of the interference pattern when detected using a large area detector.

Figure 4:
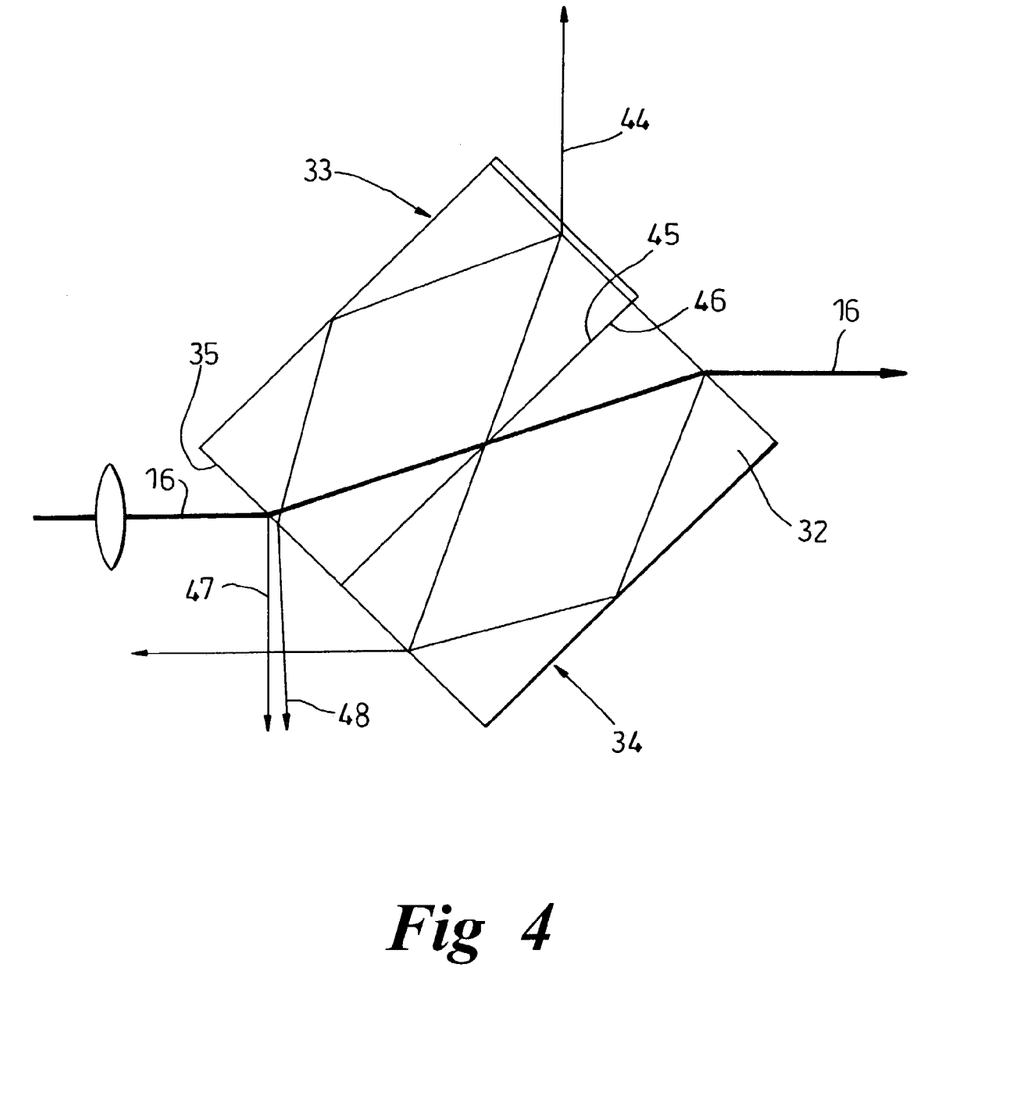
FIG. 4 is a schematic diagram of a part of the wavelength locking apparatus similar to that of FIG. 3, but with an angular error in the manufacture of one of the blocks.

As shown in FIG. 4, in which the same elements have the same reference numbers as in FIG. 3, the two blocks 33 and 34 have opposing faces 45 and 46 that are conjoined in the same manner as in FIG. 3. However, one or more of the faces of the blocks have manufacturing errors such that the light reflected from the input face 35 of the interferometric device 32 along optical path 47 is not coincident with the light that has been internally reflected in the interferometric device 32 to pass through the input face 35 and exit along optical path 48. Consequently, the light in optical path 47 and in optical path 48 does not interfere.

Figure 5:
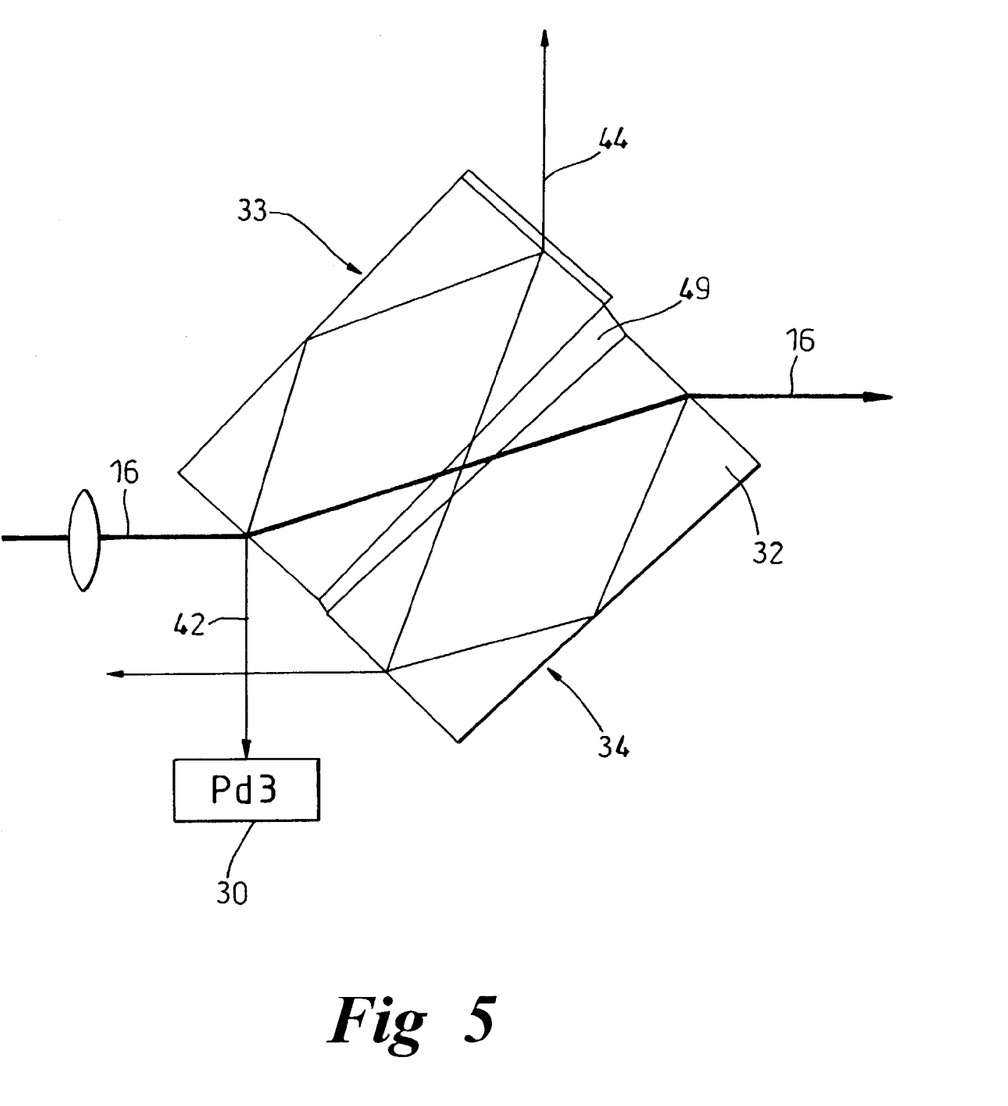
FIG. 5 is a schematic diagram of the part of wavelength locking apparatus of FIG. 4 showing how the blocks can be adjusted to compensate for the angular error.

As shown in FIG. 5, the two blocks 33 and 34 may be conjoined by means of an ultra-violet light curable optical cement 49 having a refractive index substantially matching that of the two sub-blocks. The optical cement 49 is applied between the two sub-blocks and the sub-blocks are mounted in an alignment jig (not shown) in which their relative positions can be adjusted. The electromagnetic radiation is then transmitted along the main optical path 16 and the interference fringes formed by the interference of the light at third photodiode 30 along optical path 42 is measured while the two-sub-blocks 33 and 34 are adjusted until the interference fringe is optimal. The adjustment may involve relative rotation and/or translation. Furthermore, the thickness of the optical cement 49 can be adjusted so as to adjust the phase and free spectral range of the interferometer device. The phase adjustment would typically be done to correspond to an ITU grid channel spacing. The adjustments of the free spectral range would normally be done to correct for manufacturing errors in the overall size of the blocks. The blocks are then locked in position in the alignment jig and the optical cement is cured with ultra-violet light. Monitoring of the interference beams whilst using the appropriate arrangement of translation and rotation stages to move the blocks relative to one another provides a simple feedback method for the correction of manufacturing errors in the blocks.

In order to discriminate between different peaks and troughs in the interference pattern, the distance between adjacent peaks can be varied by adjusting the dimensions of the block(s) forming the interferometric device, in order to increase or decrease the number of times the light must travel backwards and forwards between the input and output faces. The more path lengths the light must travel, the lesser the spacing between the peaks in the interference pattern. Although, the two embodiments have been described as having substantially four path lengths between the input and output faces (including a path reflected off a side face as a single path length), it will be appreciated that other numbers of path lengths can be used, for example six path lengths or greater.

As described above with reference to FIG. 2, graph Pd3 shows the interference fringes formed by the interference of the light passing along the third optical path 29 to the third photodiode 30 in FIG. 1. The graph Pd3 repeats periodically and can be used to accurately maintain the wavelength of a laser within a grid of wavelengths, such as the ITU grid. However, for the apparatus to operate at all ITU grid channels, its phase and free spectral range must be accurately set so that the locking takes place at the high slope portions of the sinusoidal graph Pd3 of FIG. 2. The wavelength locking to a grid should be so limited because at the peaks and troughs of the sinusoidal interferometer output, the slope of the signal is low or zero and changing with respective to small changes in wavelength, so that accurate wavelength determination is difficult to achieve. Setting the phase and free spectral range is possible, but requires accurate alignment of the blocks 33 and 34 during manufacture of the interferometer and accurate alignment of the interferometer within a package.

Figures 6, 7, 8:
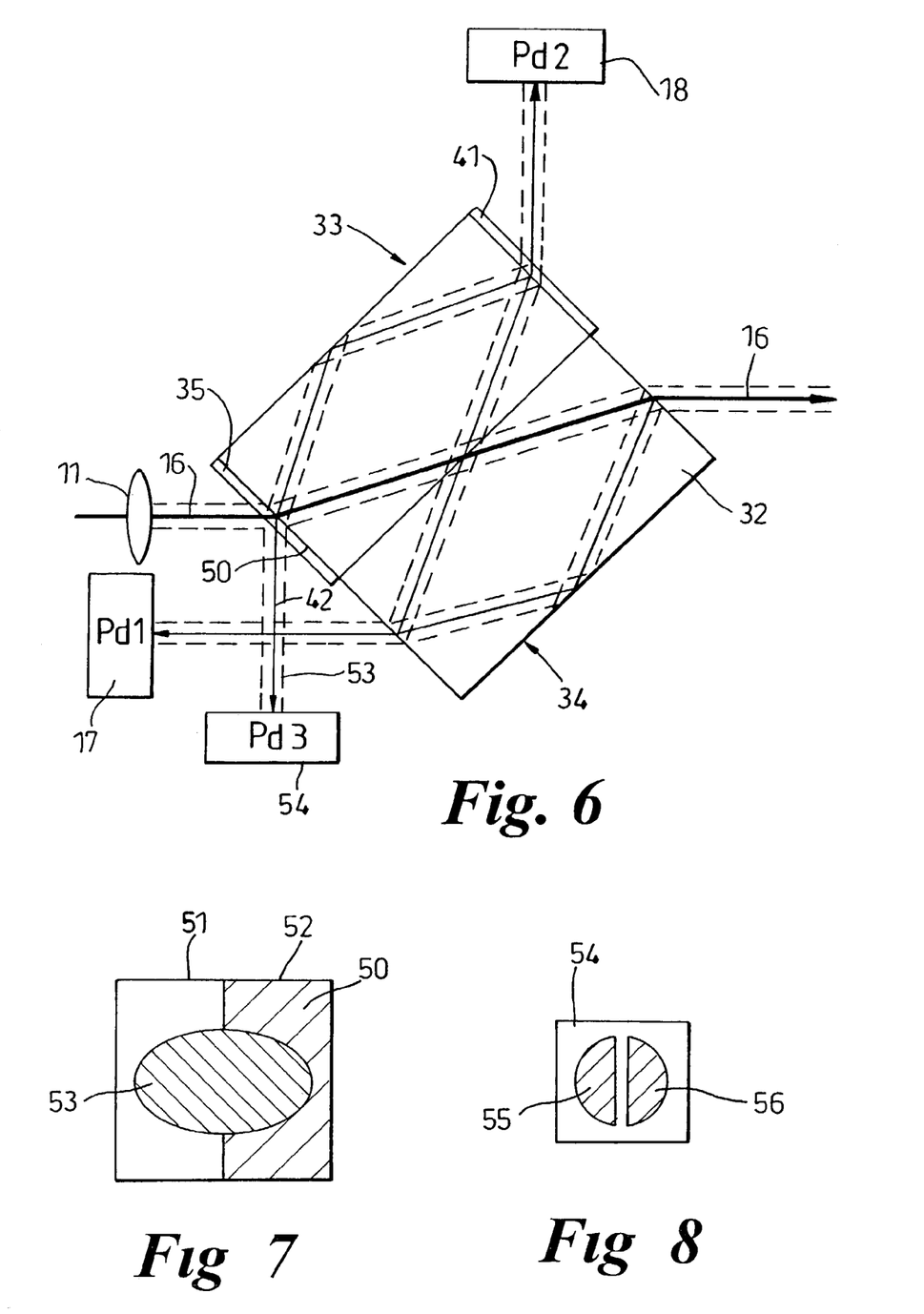
FIG. 6 is a schematic diagram, similar to that of FIG. 3, of a further embodiment of a wavelength locking apparatus.
FIG. 7 shows the input/output face of the interferometric device used in the apparatus of FIG. 6.
FIG. 8 shows a segmented photodiode used in the apparatus of FIG. 6.

Thus, FIG. 6 shows the interferometric device 32 of FIG. 3, which typically has a size of approximately 1.5 mm square, operating with a collimated laser beam diameter of approximately 400 μm. The remainder of the interferometric device 32 is substantially similar to that of FIG. 3 and therefore will not be further described, except that half of the input face 35 of block 33 is provided with a coating 50, as shown in FIG. 7. As can there be seen, the coating 50 is located such that the laser beam 53 passing along optical path 42 impinges on the boundary of the coating 50 with half the beam being incident on the coated part of the input face 33 and half the beam being incident on the uncoated part 51 of the input face 33. The coating 50 is a thin film that has the same reflective index as the material of the blocks 33 and 34, but introduces a 90° phase shift into the portion of the laser beam that is incident on the coating 50. The laser beam 53 passes along optical path 42 to the photodiode 54, which, in this embodiment, is segmented into two photodetecting segments 55 and 56, which are arranged to detect the laser beam 53 such that one segment detects the part of the laser beam from the uncoated part 51 of the input face 35 and the other segment detects the part of the laser beam 53 from the coated part 52 of the input face 35.

Figure 9:
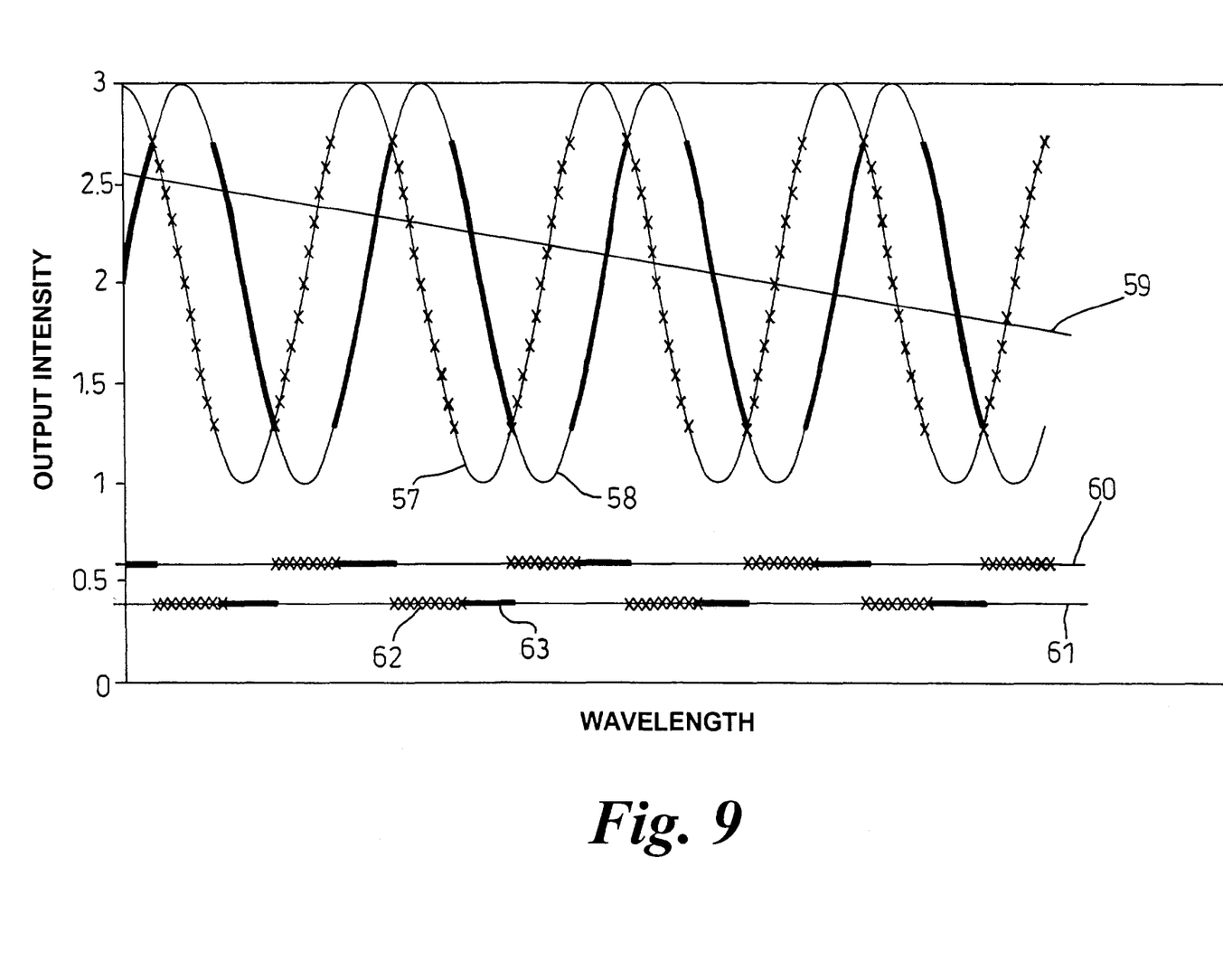
FIG. 9 shows a graph of the outputs of the interferometric device used in the apparatus of FIG. 6.

As is shown in FIG. 9, therefore, the photodetector 54 provides two sinusoidal signals 57 and 58 of intensity with respect to wavelength due to the interference of the laser beams reflected from the input face 35 and internally reflected within the interferometric device 32 and then transmitted through input face 35. Although, as shown, the two signals 57 and 58 are identical in shape and magnitude, one signal 58 is phase shifted by 90° with respect to the other one 57. As a consequence, where one of the signals has a peak or a trough, the other signal has a high slope portion. Therefore, by choosing the signal to be used, using a predetermined look-up table, the wavelength can be determined with near continuous accuracy throughout the wavelength range. This allows the apparatus to measure a continuous range of wavelengths or obviates the need for accurate phase and free spectral range setting and the associated higher accuracy of manufacture required when the interferometer is used with a grid system.

As mentioned above, the cycle number of the interferometer can be determined from the output Pd2 of the filtered photodiode 18, shown as signal 59 in FIG. 9, and the values of the signals 57 or 58, and the wavelength can be determined from that cycle number. These cycle numbers are predetermined for a particular grid, such as the ITU grid, by first setting the wavelengths to the required grid points and recording the normalised values (using the intensity output of the photodiodes) of the filtered signal Pd2 and the two interferometer signals Pd3. In this way the best signal output of the interferometer photodiode 54 can be chosen for best locking characteristics and the slope of the feedback circuit can be determined. The recorded values of the interferometer output are then used to lock to a specific grid point. Lines 60 and 61 in FIG. 9 respectively show the positive and negative locking slopes, with the hashed portions 62 and the bold portions 63 of these lines indicating the wavelength ranges in which each of the two signals 57 and 58, respectively, should be used.

Whilst several particular embodiments of the invention have been described above, it will be appreciated that a person skilled in the art can make modifications and improvements without departing from the scope of the present invention. For example, when the interferometric device is used in the embodiment of FIG. 1, it may be possible to use other interferometric devices, such as etalons to provide the interference patterns, depending on the configuration of the beam splitter and the photodiodes. Furthermore, although the reflective coatings have been stated as having particular values of reflectiveness, it will be appreciated that other values could be used. In particular, the reflectiveness of the coatings can be of any value that provides sufficient light for a clear reading to be obtained by the respective photodetector, while balancing the need for most of the light to be transferred to the operating system.

What is claimed is:

1. An apparatus for detecting a wavelength of electromagnetic radiation, the apparatus comprising:
   a first electromagnetic radiation detector for receiving a first proportion of electromagnetic radiation that has been redirected from a main electromagnetic radiation path;
   a second electromagnetic radiation detector for receiving a second proportion of electromagnetic radiation that has been redirected from the main electromagnetic radiation path;
   a third electromagnetic radiation detector for receiving a third proportion of electromagnetic radiation that has been redirected from the main electromagnetic radiation path;
   a filter arranged for filtering the second proportion of the electromagnetic radiation before it reaches the second electromagnetic radiation detector;
   an interferometric device arranged for causing the third proportion of the electromagnetic radiation to interfere with itself before it reaches the third electromagnetic radiation detector; and
   processing means coupled to receive a first signal from the first electromagnetic radiation detector indicating an intensity of the first proportion of the electromagnetic radiation detected by the first electromagnetic radiation detector, a second signal from the second electromagnetic radiation detector indicating an intensity of the second proportion of the electromagnetic radiation from the filter detected by the second electromagnetic radiation detector and a third signal from the third electromagnetic radiation detector indicating an intensity of the third proportion of the electromagnetic radiation from the interferometric device detected by the third electromagnetic radiation detector, the processing means determining a wavelength of the electromagnetic radiation based on the ratios of the first and second signals and the first and third signals.

2. An apparatus as claimed in claim 1, wherein said filter is a broadband filter.

3. An apparatus as claimed in claim 1, further comprising at least one electromagnetic radiation splitter arranged in the main path of the electromagnetic radiation for redirecting said first proportion of the electromagnetic radiation to the first electromagnetic radiation detector and for redirecting said second proportion of the electromagnetic radiation to the filter.

4. An apparatus as claimed in claim 1, wherein said interferometric device comprises a block of material that can transmit electromagnetic radiation, the block having a partially transmissive input face, an at least partially internally reflective output face and a pair of at least partially internally reflective side faces, such that said third proportion of electromagnetic radiation can, in use, partially externally reflect from and partially transmit through the input face, at least partially internally reflect from said output face, at least partially internally reflect from said side faces, and at least partially transmit back through the input face so as to interfere with the part that externally reflects from the input face.

5. An apparatus as claimed in claim 4, wherein said interferometric device forms said electromagnetic radiation splitter, the interferometric device being arranged in the main electromagnetic radiation path for redirecting said first proportion of the electromagnetic radiation to the first electromagnetic radiation detector, for redirecting said second proportion of the electromagnetic radiation to the filter and for redirecting said third proportion of the electromagnetic radiation such that it interferes with itself and is directed to the third electromagnetic radiation detector.

6. An apparatus as claimed in claim 4, wherein said interferometric device is formed of at least two conjoined sub-blocks of electromagnetic radiation transmitting material, so that the input and output faces of the interferometric device are formed from faces of the different sub-blocks, each sub-block having coatings of different reflective and transmissive characteristics formed thereon, whereby at least, the input and output faces of the interferometric device have different reflective and transmissive characteristics on different areas thereof.

7. An apparatus as claimed in claim 6, wherein at least one of said coatings provided on at least part of the output face of the interferometric device has a wavelength dependent transmission characteristic to form said filter.

8. An apparatus as claimed in claim 4, wherein dimensions of the block are predetermined so that a portion of electromagnetic radiation incident on the input face of the block at an input area is internally reflected by the output face a predetermined number of times, so as to exit the block at the input area and interfere with the electromagnetic radiation incident on the input face of the block and externally reflected thereby, the predetermined number of times being determined according to the required spacing of interference peaks required at the third electromagnetic detector.

9. An apparatus as claimed in claim 4, wherein said input face of the block is partially coated with a coating that introduces a phase shift into part of said third proportion of the electromagnetic radiation, the third electromagnetic radiation detector having at least two separate detectors for detecting respectively the part of said third proportion of the electromagnetic radiation that has been phase shifted by the coating and the part of said third proportion of the electromagnetic radiation that has not been so phase shifted, wherein said third signal is provided by one of the two separate detectors.

10. An apparatus as claimed in claim 9, further comprising a look-up table stored in a memory coupled to the processing means having stored therein information regarding which of the two separate detectors is to be used as the third signal, depending on the wavelength to be determined.

11. An apparatus as claimed in claim 1, wherein said processing means compares the ratio of the first signal and the second signal with predetermined values to determine an approximate wavelength of the electromagnetic radiation, and compares the ratio of the first signal and the third signal with predetermined values to determine a more exact value for the wavelength of the electromagnetic radiation.

12. A laser wavelength locking apparatus comprising a laser for emitting electromagnetic radiation along a main electromagnetic radiation path, an apparatus for detecting a wavelength of electromagnetic radiation emitted along said main electromagnetic radiation path according to any one of the preceding claims, a laser temperature controller coupled to the processing device for adjusting the temperature of the laser depending on the detected wavelength of the electromagnetic radiation emitted by the laser.

13. A method of detecting a wavelength of electromagnetic radiation, the method comprising:
   receiving a first proportion of electromagnetic radiation that has been redirected from a main electromagnetic radiation path;
   receiving a second proportion of electromagnetic radiation that has been redirected from the main electromagnetic radiation path via a filter;
   receiving a third proportion of electromagnetic radiation that has been redirected from the main electromagnetic radiation path via an interferometric device so as to interfere with itself;
   processing a first signal indicating an intensity of the first proportion of the electromagnetic radiation and a second signal indicating an intensity of the filtered second proportion of the electromagnetic radiation to provide a ratio of the first and second signals;
   processing the first signal and a third signal indicating an intensity of the interfered third proportion of the electromagnetic radiation to provide a ratio of the first and third signals; and
   utilising the ratios of the first and second signals and the first and third signals to determine a wavelength of the electromagnetic radiation.

14. A method of detecting a wavelength of electromagnetic radiation according to claim 13, further comprising redirecting said first proportion of the electromagnetic radiation to a first electromagnetic radiation detector and of redirecting said second proportion of the electromagnetic radiation to the filter.

15. A method of detecting a wavelength of electromagnetic radiation according to claim 13, wherein said interferometric device comprises a block of material that can transmit electromagnetic radiation, the block having a partially transmissive input face, an at least partially, internally reflective output face and a pair of internally reflective side faces, the method comprising the step of redirecting said third proportion of electromagnetic radiation onto the input face of the block so that it is partially externally reflected from and partially transmitted through the input face, at least partially internally reflected from said output face, internally reflected from said side faces, and transmitted back through the input face so as to interfere with the part that is externally reflected from the input face.

16. A method of detecting a wavelength of electromagnetic radiation according to claim 13, wherein utilising the ratios of the first and second signals and the first and third signals comprises comparing the ratio of the first signal and the second signal with predetermined values to determine an approximate wavelength of the electromagnetic radiation, and comparing the ratio of the first signal and the third signal with predetermined values to determine a more exact value for the wavelength of the electromagnetic radiation.

17. A method of detecting a wavelength of electromagnetic radiation according to claim 13, wherein part of said third proportion of the electromagnetic radiation is phase shifted with respect to another part so that the third signal comprises a pair of phase shifted third signals and said step of processing the first signal and the third signal to provide a ratio of the first and third signals comprises processing the first signal and a predetermined one of the pair of phase shifted third signals.

18. A method of locking the wavelength of electromagnetic radiation emitted by a tunable laser, the method comprising:
   emitting electromagnetic radiation from a tunable laser along a main electromagnetic radiation path;
   detecting a wavelength of electromagnetic radiation emitted along said main electromagnetic radiation path utilising the method of claim 13; and
   adjusting a temperature of the laser depending on the detected wavelength of the electromagnetic radiation emitted by the laser.

19. An interferometric device comprising a block of material that can transmit electromagnetic radiation, the block having a partially transmissive input face, an at least partially internally reflective output face and a pair of at least partially internally reflective side faces, such that electromagnetic radiation incident on the input face, in use, partially externally reflects from and partially transmits through the input face, at least partially internally reflects from said output face, at least partially internally reflects from said side faces, and at least partially transmits back through the input face so as to interfere with the part that externally reflects from the input face.

20. An interferometric device as claimed in claim 19, which is formed of at least two conjoined sub-blocks of electromagnetic radiation transmitting material, so that the input and output faces of the interferometric device are formed from faces of the different sub-blocks each sub-block having coatings of different reflective and transmissive characteristics formed thereon, whereby at least the input and output faces of the interferometric device have different reflective and transmissive characteristics on different areas thereof.

21. An interferometric device as claimed in claim 19, wherein dimensions of the block are predetermined so that a portion of electromagnetic radiation incident on the input face of the block at an input area is internally reflected by the output face a predetermined number of times, so as to exit the block at the input area and interfere with the electromagnetic radiation incident on the input face of the block and externally reflected thereby, the predetermined number of times being determined according to the required spacing of interference peaks of the electromagnetic radiation.

22. An interferometric device as claimed in claim 19, wherein said partially transmissive input face is provided over part of its surface with a coating that introduces a phase shift into the electromagnetic radiation that at least partially transmits back through the input face and the part that externally reflects from the input face.

23. A method of causing electromagnetic radiation to interfere, the method comprising:
providing an interferometric device according to claim 19; and
directing the electromagnetic radiation onto the input face, so that it partially externally reflects from and partially transmits through the input face, at least partially internally reflects from said output face, internally reflects from said side faces, and transmits back through the input face so as to interfere with the part that externally reflects from the input face.

24. A method of fabricating an interferometric device according to claim 19, the method comprising:
conjoining at least two sub-blocks of electromagnetic radiation transmitting material, so that the input and output faces of the interferometric device are formed from faces of the different sub-blocks, each sub-block having coatings of different reflective and transmissive characteristics formed thereon, whereby at least the input and output faces of the interferometric device have different reflective and transmissive characteristics on different areas thereof.

25. A method of fabricating an interferometric device according to claim 24, wherein conjoining the two sub-blocks of electromagnetic radiation transmitting material comprises:
applying a curable cement between the faces of the sub-blocks to be conjoined;
adjusting the relative positions of the sub-blocks so that the electromagnetic radiation that internally reflects within the block is substantially aligned with the electromagnetic radiation that reflects from the input face so as to interfere therewith; and
curing the cement while the sub-blocks are fixed in the adjusted relative positions.

26. A method of fabricating an interferometric device according to claim 25, wherein adjusting the relative positions of the sub-blocks comprises passing the electromagnetic radiation into the block and measuring the interference pattern while adjusting the relative positions of the sub-blocks until the interference pattern is optimal.

27. A method of fabricating an interferometric device according to claim 25, wherein the curable cement is an ultra-violet light curable optical cement having a refractive index matching the sub-blocks.

* * * * *